United States Patent [19]

Hirata

[11] 4,268,900
[45] May 19, 1981

[54] DEVICE FOR CONTROLLING A PLURALITY OF CONVERTERS

[76] Inventor: Akio Hirata, 1-10-6, Kai-machi, Fuchu-shi, Tokyo, Japan

[21] Appl. No.: 102,440

[22] Filed: Dec. 11, 1979

[30] Foreign Application Priority Data

Dec. 27, 1978 [JP] Japan .................. 53-163191

[51] Int. Cl.³ .......................... H02M 7/515
[52] U.S. Cl. .................. 363/71; 307/223 R; 363/137
[58] Field of Search ............. 307/223 R; 363/71, 72, 363/136–138

[56] References Cited

U.S. PATENT DOCUMENTS 3,609,507 9/1971 Beck .................... 363/71 X
3,713,011 1/1973 Johnson et al. .............. 363/70
3,846,693 11/1974 Compoly et al. ............ 363/71 X

OTHER PUBLICATIONS

Miyairi, Thyristor Applications Handbook, Feb. 29, 1972, pp. 296–298.

*Primary Examiner*—A. D. Pellinen

[57] ABSTRACT

A device for controlling a plurality of parallel connected converters which includes a reference circuit for controlling the converters, a frequency divider having a number of outputs corresponding to a number of the converters, and a plurality of ring counter circuits for driving the converters in response to the output of the frequency divider. Interlocking signals are supplied among the ring counter circuits such that the ring counter circuits recover when a noise signal is applied.

8 Claims, 19 Drawing Figures

DEVICE FOR CONTROLLING A PLURALITY OF CONVERTERS

BACKGROUND OF THE INVENTION

1. Field of the Invention

This invention generally relates to a device for controlling a plurality of converters which are connected in parallel with each other to convert from a DC power source to AC power, and more particularly to a controlling device in which a phase difference between the converters will be maintained at a predetermined value.

2. Description of the Prior Art

In the past a plurality of current control type frequency converters or inverters which are connected in parallel with each other to convert from DC power to AC power, have been employed to control a load, such as an AC electric motor. Each of the converters is provided with a ring counter to transmit signals to controllable semiconductor switching elements, such as thyristors. These ring counters are controlled by control signals from a referernce circuit. Thus, in the case where the AC electric motor is driven by a plurality of parallel connected converters, the generated control pulse is distributed to each converter through a respective ring counter so as to maintain the phase difference between the outputs of each converter at a predetermined value.

However, such a prior art system has a problem in that if a noise signal is added to the distributed pulse, it is impossible to keep the predetermined phase difference as described above, whereby the output of the parallel connected converters includes some distorted waves or some harmonic components. Therefore, it is difficult to continue the operation of the AC electric motor.

SUMMARY OF THE INVENTION

Accordingly, it is one object of this invention to provide a new and improved unique device for controlling a plurality of parallel connected converters in which the predetermined phase difference between each converter is maintained. Even though a noise signal is added to the controlling device, the predetermined phase difference will be recovered after the predetermined time.

Briefly, in accordance with one aspect of the present invention, a device for controlling a plurality of parallel connected converters is disclosed. This device includes a reference circuit for producing a reference signal having a frequency proportional to the frequency of the output of the controlling device. A plurality of converter drivers are coupled to each of the parallel power converters for driving the converters in response to the reference signal with one converter driver being provided for each of the parallel converters. An interlock is coupled to each of the plurality of converter drivers for supplying interlock signals to each of the plurality of converter drivers and for maintaining each of the power converters in an exact phase relationship to each other.

BRIEF DESCRIPTION OF THE DRAWINGS

A more complete appreciation of the invention will be readily obtained as the same becomes better understood by reference to the following detailed description when considered in connection with the accompanying drawings, wherein:

FIGS. 2A-1, 2A-2, 2B-1 and 2B-2 are time charts indicating waveforms of various parts shown in FIG. 1;

DETAILED DESCRIPTION OF THE PREFERRED EMBODIMENTS

Figure 1:
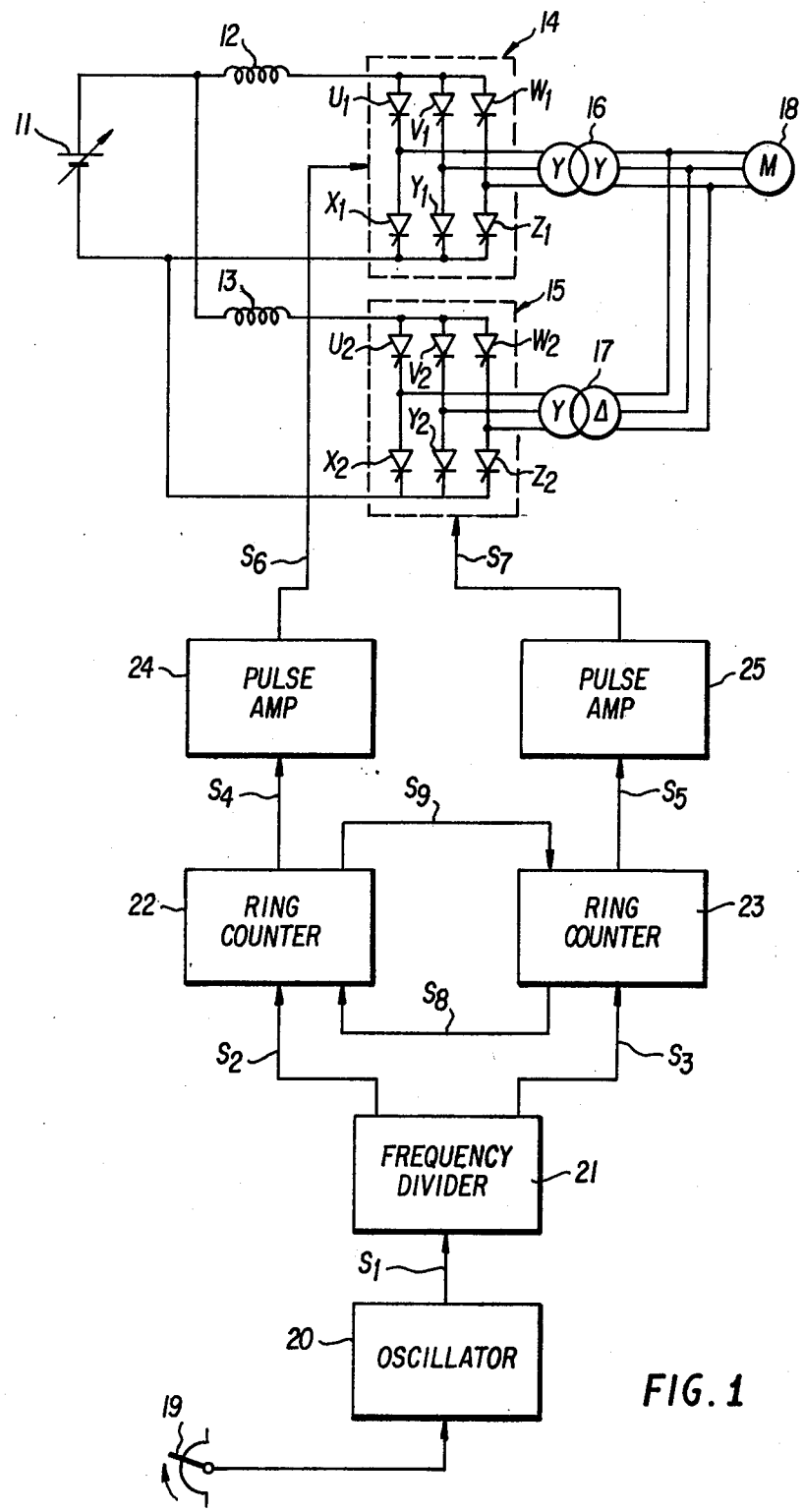
FIG. 1 is a circuit diagram of one embodiment of a controlling device for an AC electric motor according to this invention.

Referring now to the drawings, wherein like numerals or letters designate identical or corresponding parts throughout the several views and more particularly to FIG. 1 thereof, wherein DC power from a variable DC power source 11 is supplied to two parallel connected converters, for example current control type inverters 14 and 15, through DC reactors 12 and 13, respectively. The AC power output of inverters 14 and 15 is supplied to a load, for example an AC electric motor 18, through transformers 16 and 17, whereby the electric motor is speed-controlled in response to the output (voltage and frequency) of the converters.

To reduce the harmonic component included in the output of the converters, the phase of the current control type inverter 14 leads by thirty degrees the phase of the current control type inverter 15. To compensate for the phase difference between the two outputs of inverters 14 and 15, the transformers 16 and 17 are respectively connected Y to Y and Y to Δ.

Such a control system for an AC electric motor has been described in the monthly magazine "OHM" 78/3, Vol. 65/No. 4, March 1978, on pages 40-43. However, this article differs from the present invention in that the present invention does not relate to such a multi-parallel method of connection in the converter.

In the control system, to create the relationship wherein the phase of inverter 14 leads by thirty degrees the phase of inverter 15, a reference circuit, including a control 19 and an oscillator 20 which responds to the position value of control 19, generates pulse signal $S_1$ which has a frequency twelve times that of the frequency of the output signal of the inverter which is supplied to the electric motor 18. The frequency of the generated pulse signal $S_1$ is divided by two by a dividing means such as a frequency divider 21, so as to produce two pulse signals $S_2$ and $S_3$. The phase of pulse signal $S_2$ leads by thirty degrees the phase of pulse signal $S_3$, and the respective frequency of pulse signals $S_2$ and $S_3$ is six times that of the output signal to be supplied the AC electric motor. The pulse signals $S_2$ and $S_3$ are, respectively, counted by counting means such as, for example, ring counter circuits 22 and 23. As shown in time charts $S_4$ and $S_5$ of FIGS. 2A-1, and 2A-2, pulse signals $S_2$ and $S_3$ are each converted into six separate signals $U_{11}$ through $Y_{11}$, and $U_{21}$ through $Y_{21}$.

The pulse signals $S_4$ and $S_5$, as described hereinafter in detail, are respectively formed into gate controlling signals $S_6$ and $S_7$ by pulse amplifiers 24 and 25, and are supplied to the main controllable semiconductor switching elements of inverters 14 and 15, for example thyristors $U_1$ through $Z_1$, and $U_2$ through $Z_2$. The main thyristors of inverter 14 are turned on the order $U_1$, $Z_1$, $V_1$, $X_1$, $W_1$, $Y_1$, such that each thyristor has a conductive period of 120° with each conductive period beginning 60° after the beginning of the previous conductive period. Although in the time chart $S_7$ of FIGS. 2A-1 and 2A-2 only the control signal for thyristor $U_2$ is shown, it should be understood that $S_7$ is similar to $S_6$ with the exception of a 30° offset. Accordingly, the main thyristors of the inverter 15 are turned in order $U_2$, $Z_2$, $V_2$, $X_2$, $W_2$ and $Y_2$ such that each thyristor has a conductive period of 120° with each conductive period beginning 60° after the beginning of the previous conductive period. Thus, since the phase of the inverter 14 leads by thirty degrees the phase of the inverter 15, the outputs of the inverters 14 and 15 supplied to the AC electric motor 18 do not include a harmonic component.

Figure 3:
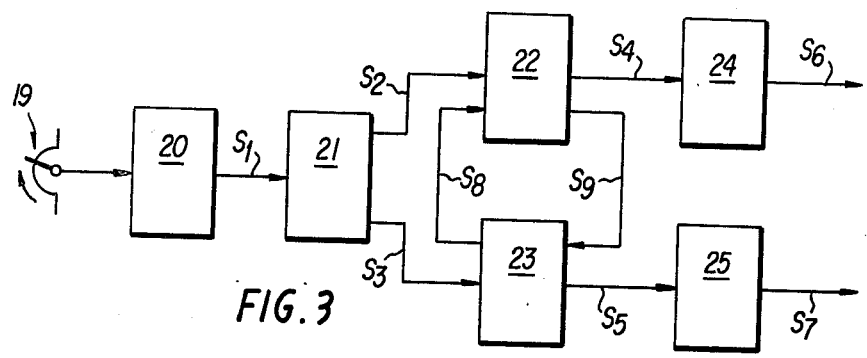
FIG. 3 is a more detailed block diagram of a portion of the controlling device shown in FIG. 1.
Figure 4:
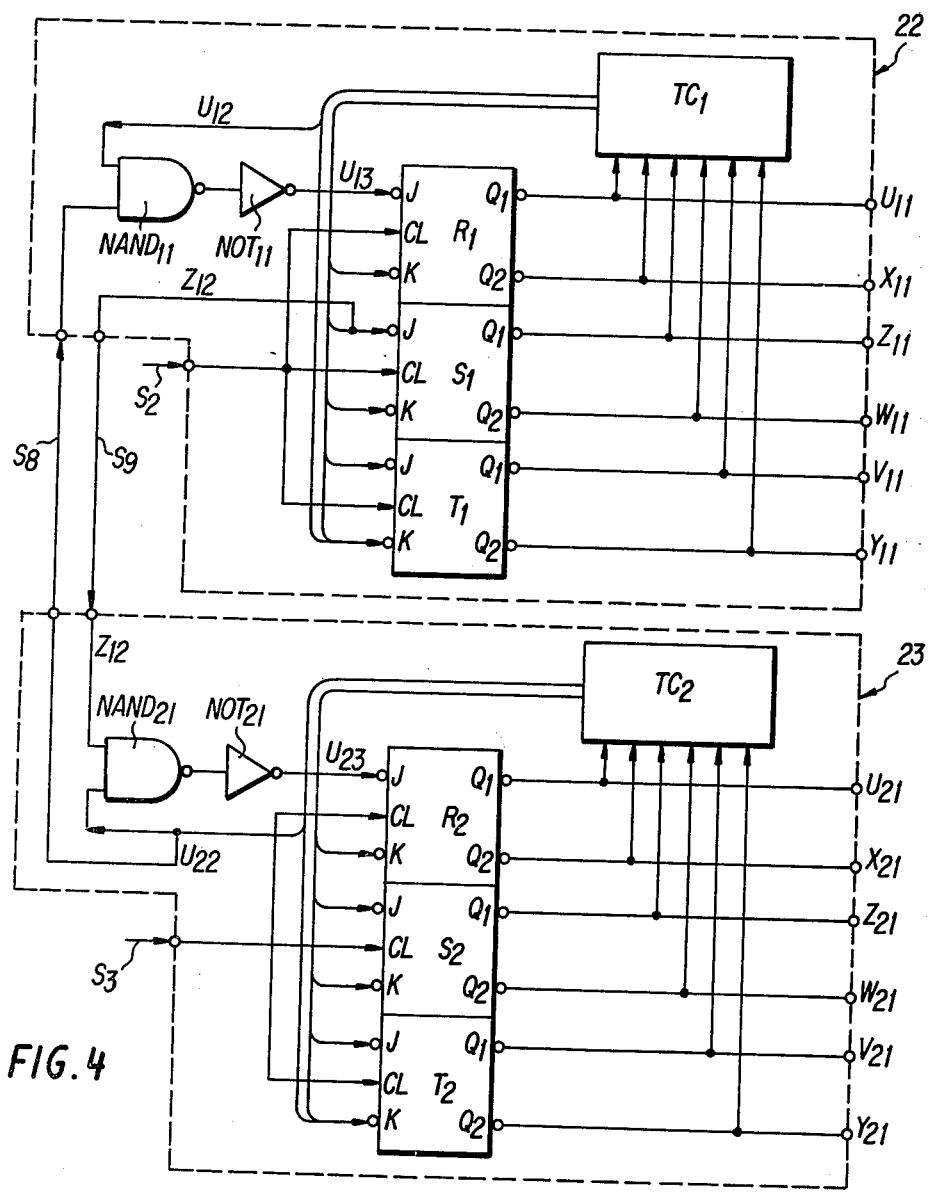
FIG. 4 is a detailed circuit diagram of a part of the controlling device shown in FIG. 1.
Figure 5A:
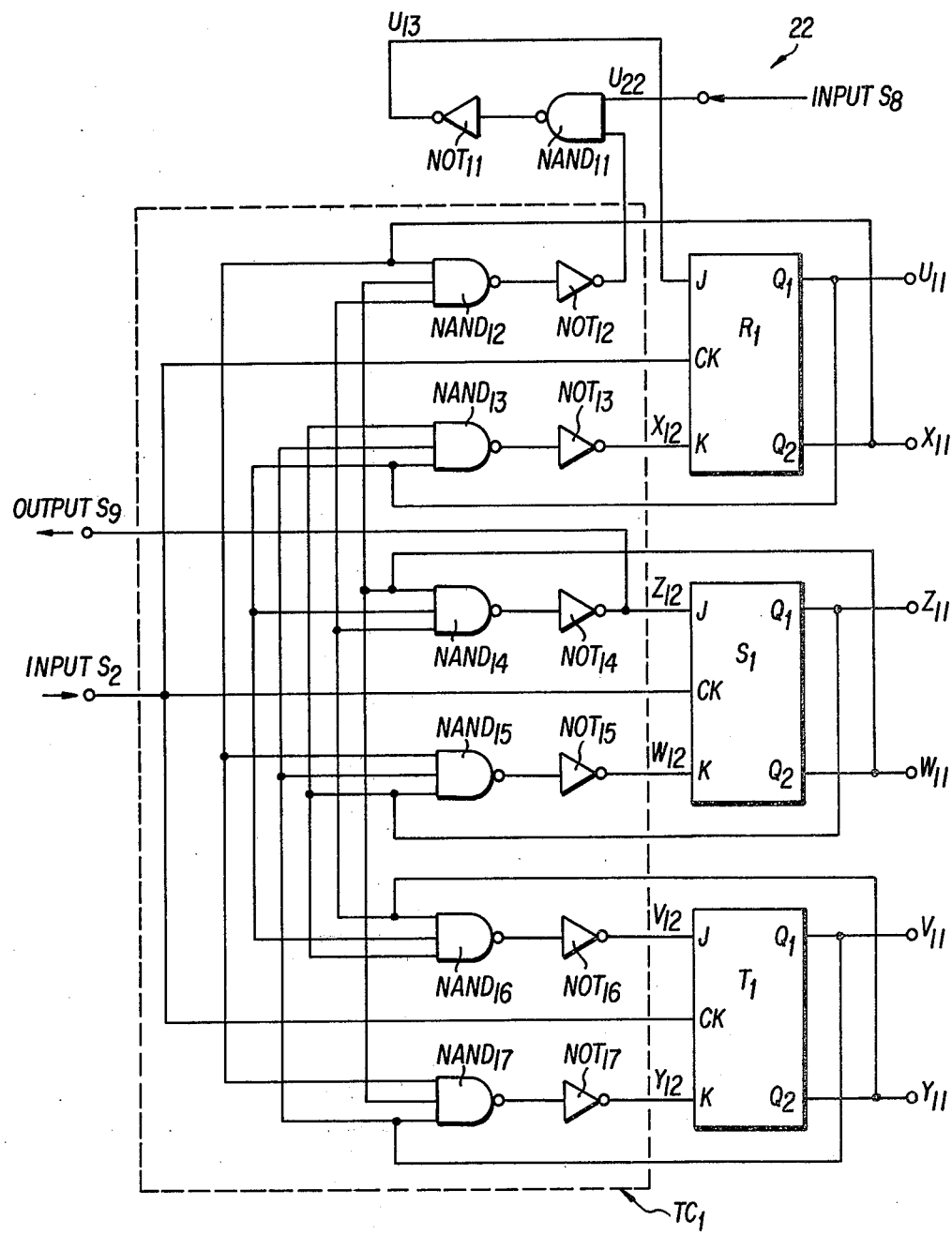
FIGS. 5A and 5B are detailed circuit diagrams illustrating a part of the circuits shown in FIG. 4.
Figure 5B:
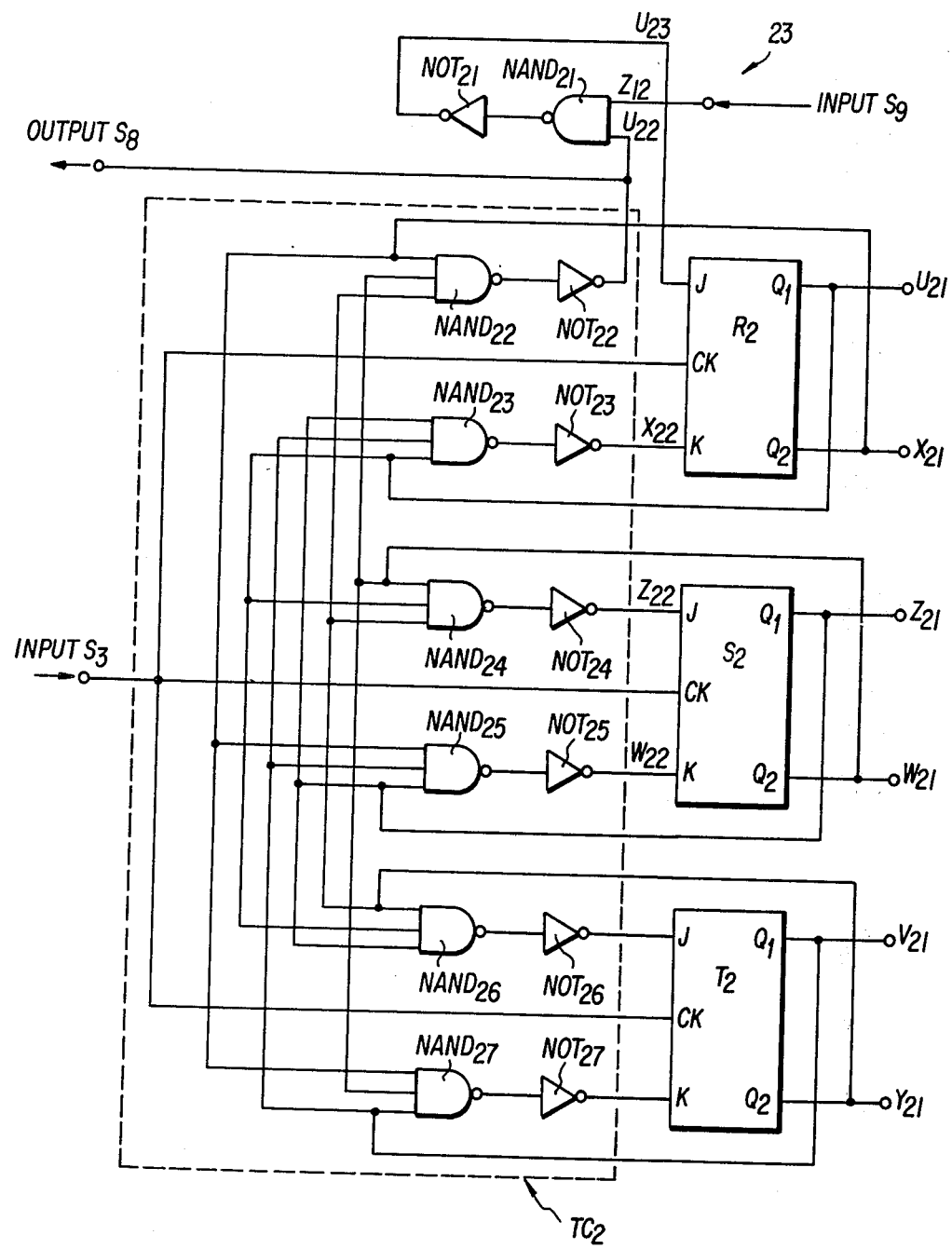

Referring now to FIGS. 3, 4, 5A and 5B, the operation of, and more particularly the interlocking signals of the controlling device of the present invention will be explained in detail. Since the theory of operation of the ring counter circuits 22 and 23 of the converter driving means are identical, the operation of these circuits will be explained simultaneously as follows. Interlocking signals $S_8$ and $S_9$ are respectively connected between the ring counter circuits 22 and 23 as shown in FIG. 3. The ring counter circuits 22 and 23 are each provided with three J-K type flip-flops: $R_1$, $S_1$, $T_1$, and $R_2$, $S_2$, $T_2$ respectively. Additionally ring counter circuits 22 and 23 are each provided with one timing check circuit: $TC_1$ and $TC_2$, respectively. FIG. 4 is a block diagram of the interconnected ring counter circuits 22 and 23. FIGS. 5A and 5B are more detailed schematic diagrams of ring counter circuits 22 and 23, respectively.

Figures 1, 2A:
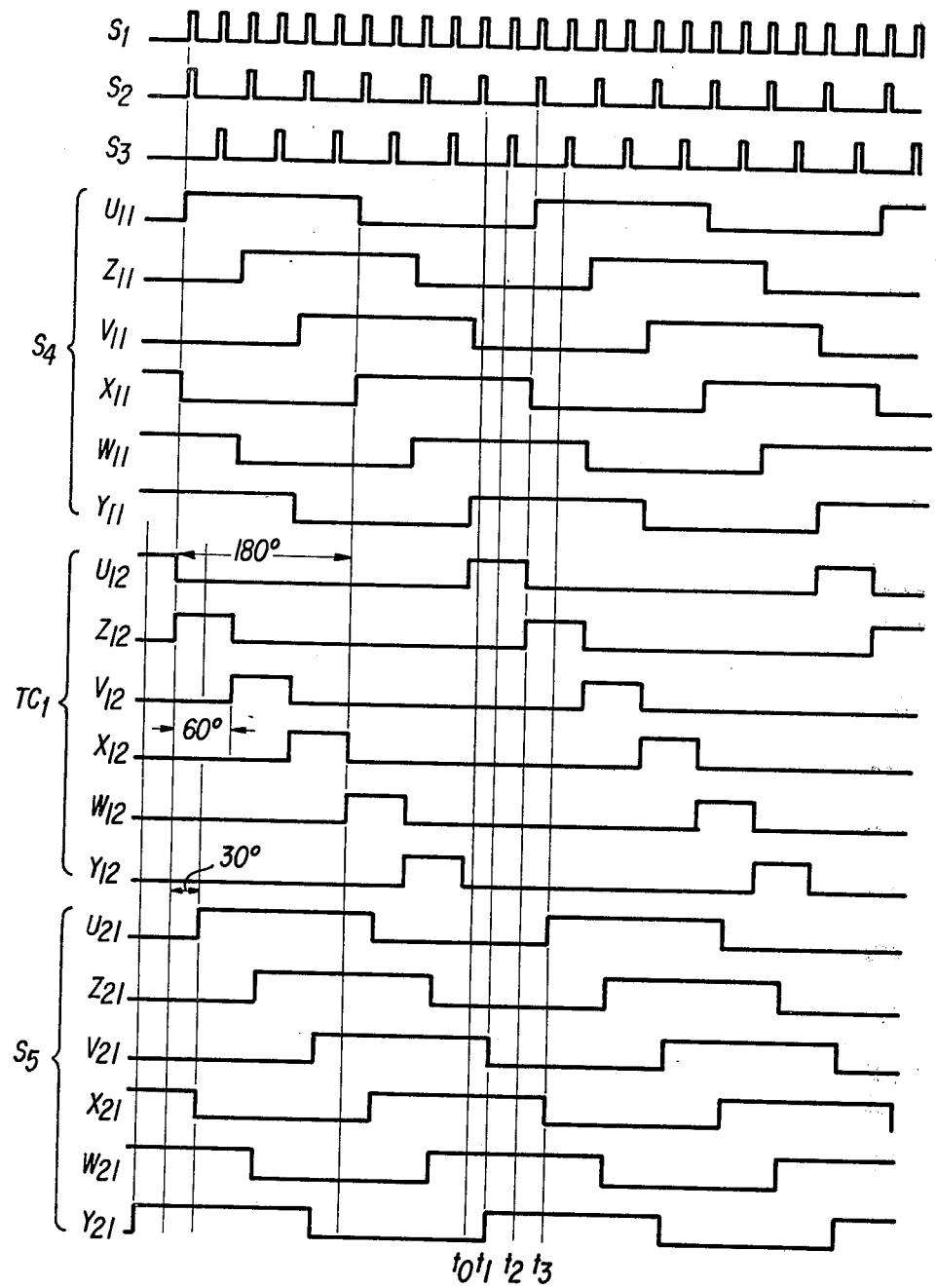
Figures 2, 2A:
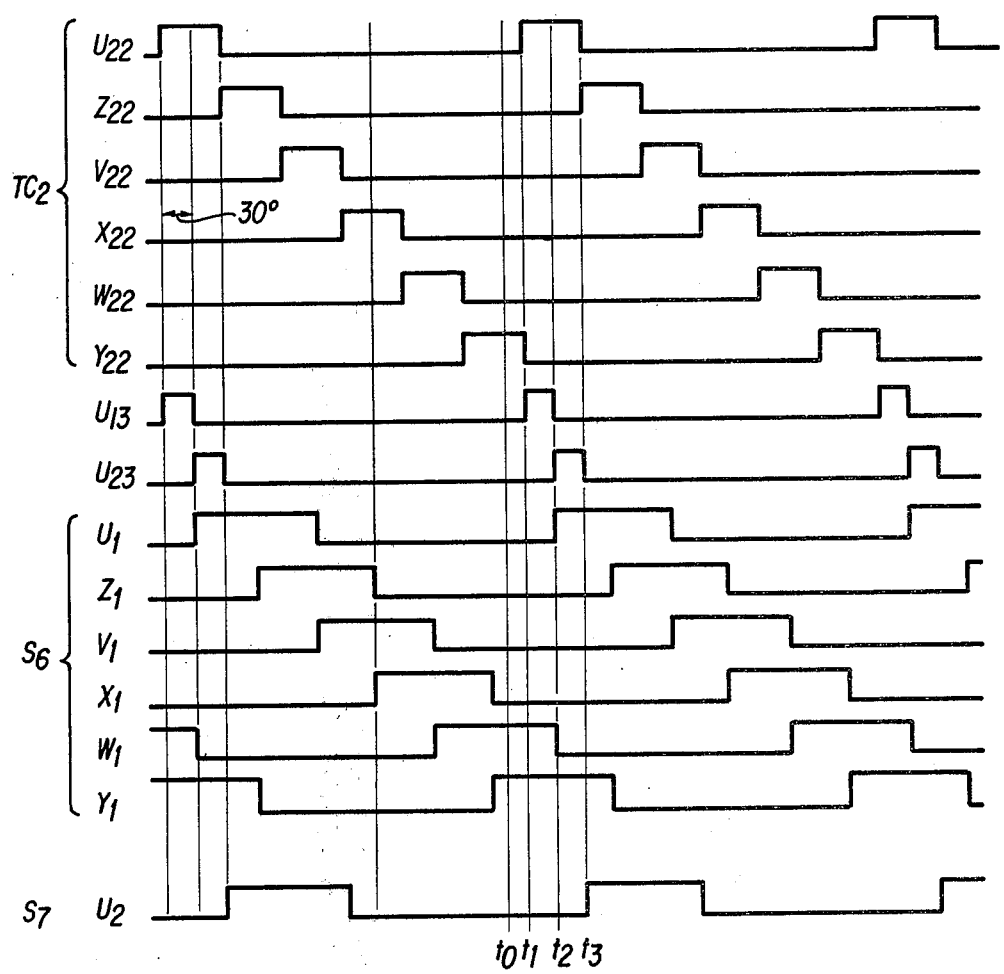

In the J-K flip-flip of the ring counters 22 and 23, as is well known, the logic level of the output terminals $Q_1$ or $Q_2$ changes when the pulse signal $S_2$ or $S_3$, acting as a clock signal, is changed from "0" to "1" provided that one terminal J or K is at a logic "1," and the other terminal K or J is at a logic "0." In order to obtain output signals $U_{11}$ through $Y_{11}$ or $U_{21}$ through $Y_{21}$, as shown in FIGS. 2A-1 and 2A-2, which are each spaced at a phase of sixty degrees from each other, the signal $U_{13}$, $U_{23}$ instead of the signal $U_{12}$, $U_{21}$, is supplied to respective input terminals J of the J-K flip-flops $R_1$, $R_2$. Similarly, the signal $X_{12}$, $X_{22}$ is supplied to respective input terminals K of J-K flip-flops $R_1$, $R_2$; the signal $Z_{12}$ or $Z_{22}$ is supplied to respective input terminals J of the flip-flops $S_1$, $S_2$; the signal $W_{12}$, $W_{22}$ is supplied to respective input terminals K of the flip-flops $S_1$, $S_2$; the signal $V_{12}$, $V_{22}$ is supplied to respective input terminals J of the flip-flops $T_1$, $T_2$; and the signal $Y_{12}$, $Y_{22}$ is supplied to respective input terminals K of the flip-flops $T_1$, $T_2$. As shown in FIGS. 5A and 5B, each of the output signals $U_{11}$ through $Y_{11}$ or $U_{21}$ through $Y_{21}$ are supplied to respective timing check circuits $TC_1$, $TC_2$ and are added through a series circuit of a $NAND_{11}$ and $NOT_{11}$, and the series circuit of $NAND_{12}$ through 17 and $NOT_{12}$ through 16 in the timing check circuit $TC_1$; and are added through a series circuit of $NAND_{21}$ and $NOT_{21}$, and the series circuits of $NAND_{22}$ through 27 and $NOT_{22}$ through 27 in the timing check circuit $TC_2$. In addition, as shown in FIGS. 2A-1 and 2A-2, the output signals $U_{22}$ through $Y_{22}$ of the timing check circuit $TC_2$ lags the output signals $U_{12}$ through $Y_{12}$ of the timing check circuit $TC_1$ by thirty degrees; otherwise both sets of waveforms are identical.

Thus, the output signal $U_{22}$ of the timing check circuit $TC_2$ of the ring counter 23 is supplied to one terminal of the $NAND_{11}$ of the ring counter circuit 22 as the interlock signal $S_8$. When both the signal $U_{12}$ and signal $U_{22}$ are at logic "1," as shown in FIGS. 2A-1 and 2A-2, a logic "1" signal from the $U_{13}$ output of $NOT_{11}$ is supplied to the input terminal J of the J-K type flip-flop $R_1$ of the ring counter 22. The output signal $U_{22}$ will be a logic "1" when the signals $X_{21}$, $W_{21}$ and $Y_{21}$ of the ring counter circuit 23 are at logic "1." Accordingly, the output signal $U_{11}$ of ring counter 22 will change from logic "0" to "1" when the pulse signal $S_2$ from frequency divider 21 changes from logic "0" to "1."

On the other hand, the output signal $Z_{12}$ of the timing check circuit $TC_1$ of the ring counter 22 is supplied to one temrinal of $NAND_{21}$ of the ring counter circuit 23 as the interlock signal $S_9$. When both the signal $Z_{12}$ and the signal $U_{22}$ are "1, " as shown in FIGS. 2A-1 and 2A-2, a logic signal from the $U_{23}$ output of $NOT_{21}$ is supplied to the input terminal J of the J - K type flip-flop $R_2$ of the ring counter 23. The output signal $Z_{12}$ will be a logic "1" when the signals $W_{11}$, $Y_{11}$ and $U_{11}$ of the ring counter circuit 22 are at logic "1." Accordingly, the output signal $U_{21}$ of the ring counter circuit 23 will change from logic "0" to logic "1" when the pulse signal $S_3$ from the frequency divider 21 changes from logic "0" to "1."

Figure 6A:
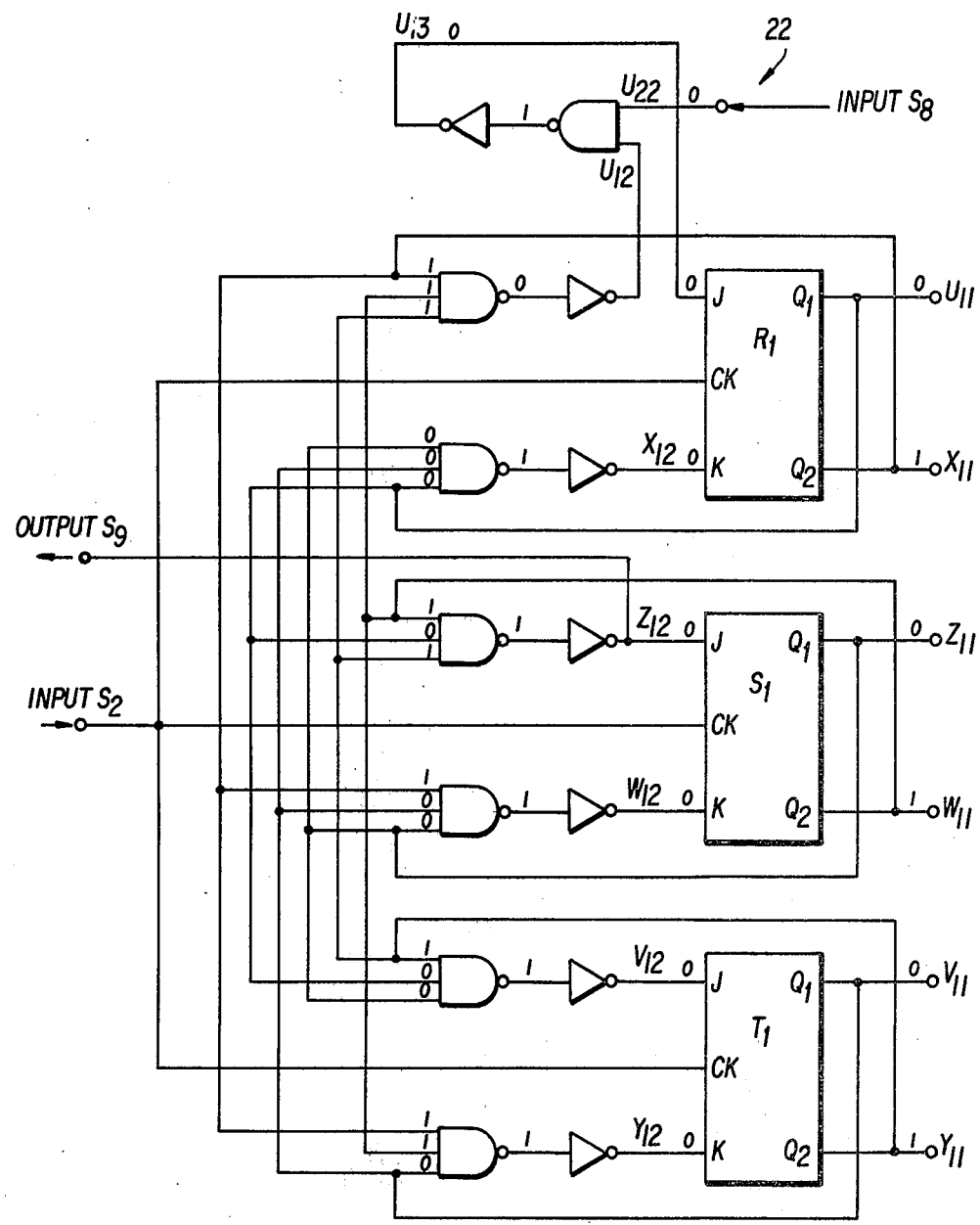
FIGS. 6A through 6H are circuit diagrams showing the logic states of the circuits shown in FIGS. 5A and 5B.
Figure 6B:
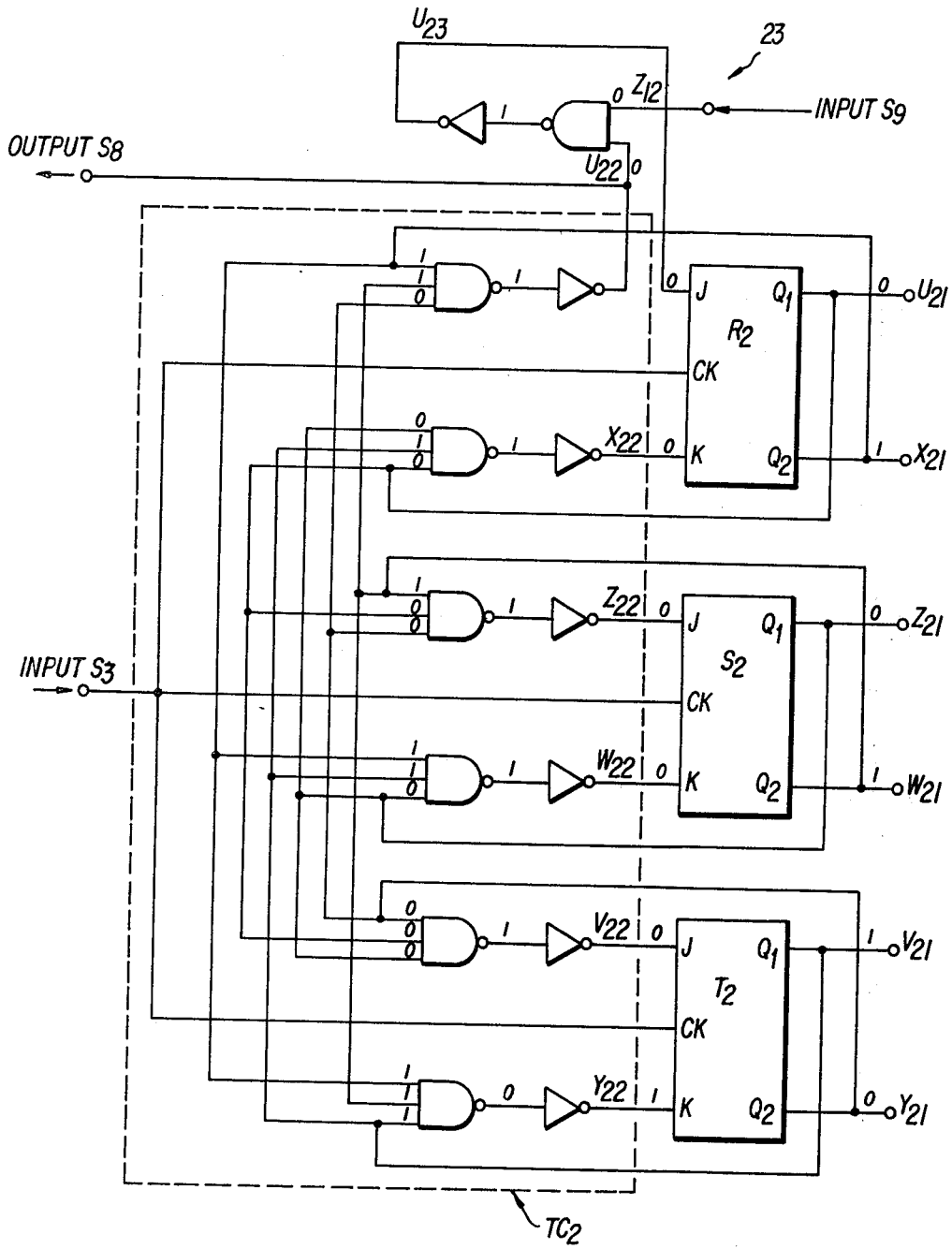
Figure 6C:
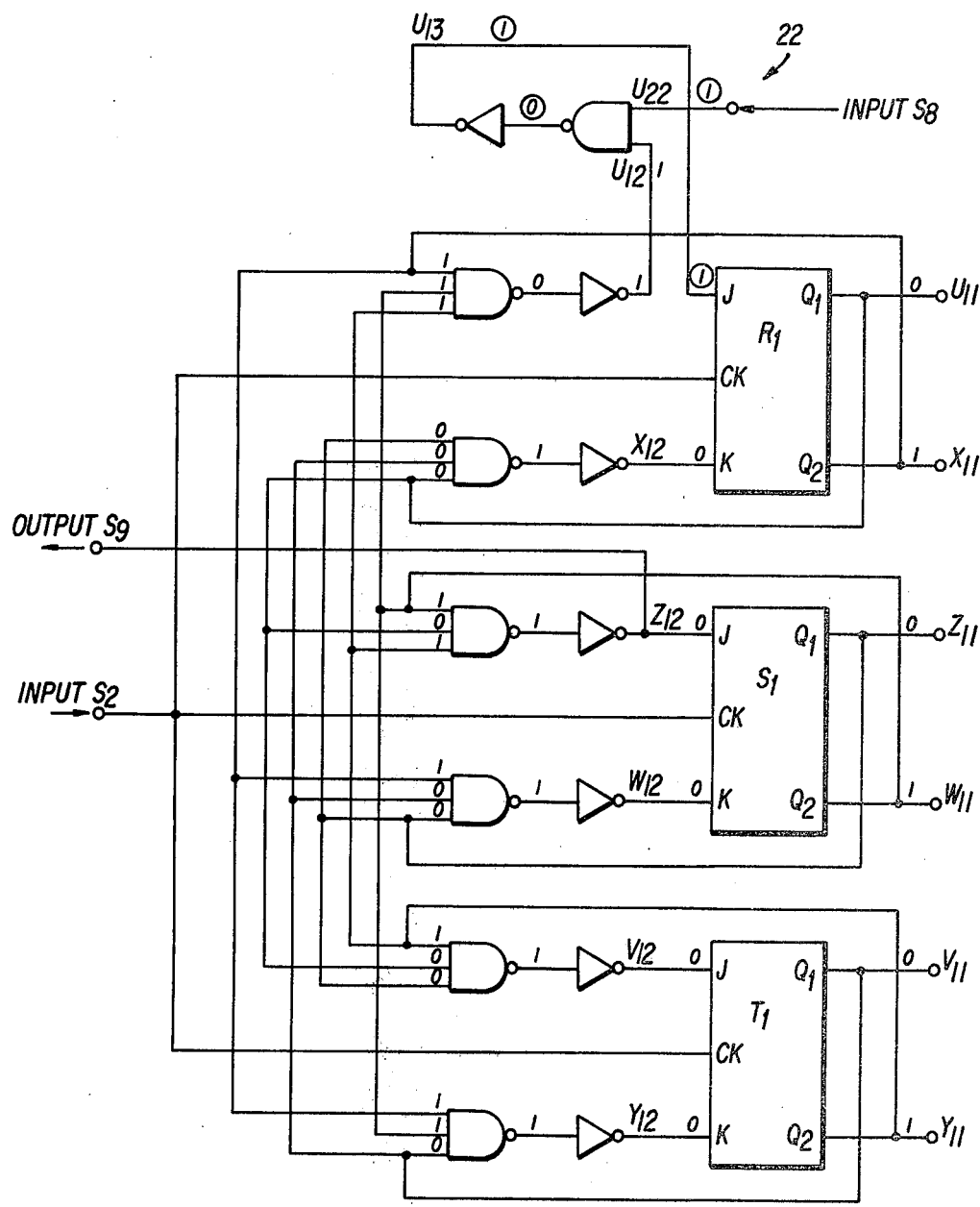
Figure 6D:
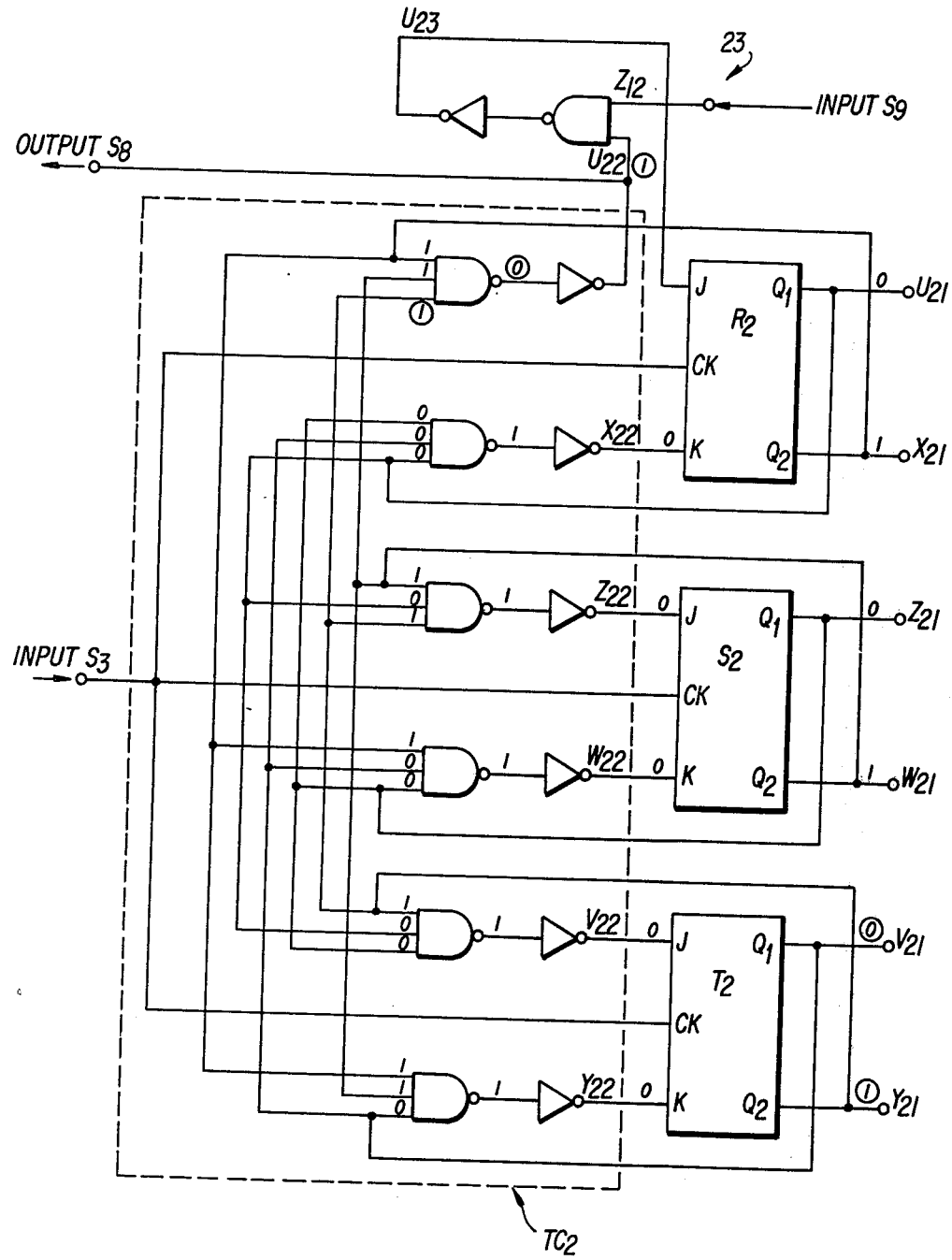

The normal operation of the ring counter circuits 22 and 23 is explained with reference to FIGS. 6A through 6H. FIGS. 6A, 6C, 6E and 6G are schematic representations of ring counter circuit 22 showing counter 22 in various operating states. FIGS. 6B, 6D, 6F and 6H are schematic representations of ring counter circuit 23 showing counter 23 in various operating states. The logic level "0" or "1" of each point of the ring counter circuits 22 and 23 at time $t_0$ of FIGS. 2A-1 and 2A-2 are shown in respective FIGS. 6A and 6B. When the pulse $S_3$, as shown at time $t_1$ of FIGS. 2A-1 and 2A-2 is applied to the terminal CK of the ring counter 23, the outputs $Q_1$ and $Q_2$ of the J - K flip-flop $T_2$ of the ring counter circuit 23 are changed as shown in FIGS. 2A-1 and 2A-2. That is, as a result the output of the terminal $Y_{11}$ changes to "1," and thus the output of the terminal $U_{22}$ changes to "1" as shown in FIG. 6D. Therefore the output terminal $U_{13}$ becomes "1" as shown in FIG. 6C. In FIGS. 6A through 6H, when the state of an output is changed, it is indicated by enclosing the changed state by a circle.

Figure 6E:
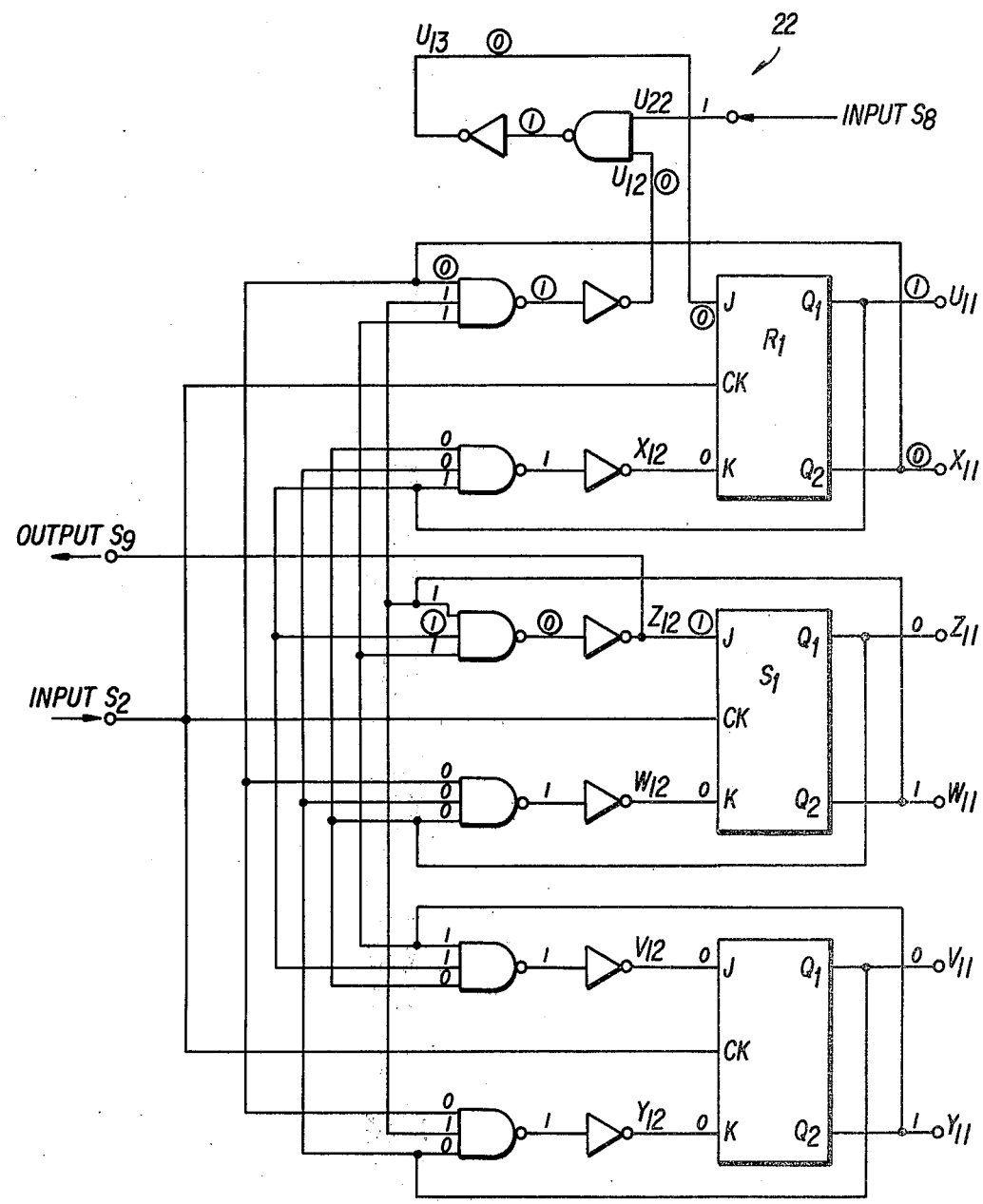
Figure 6F:
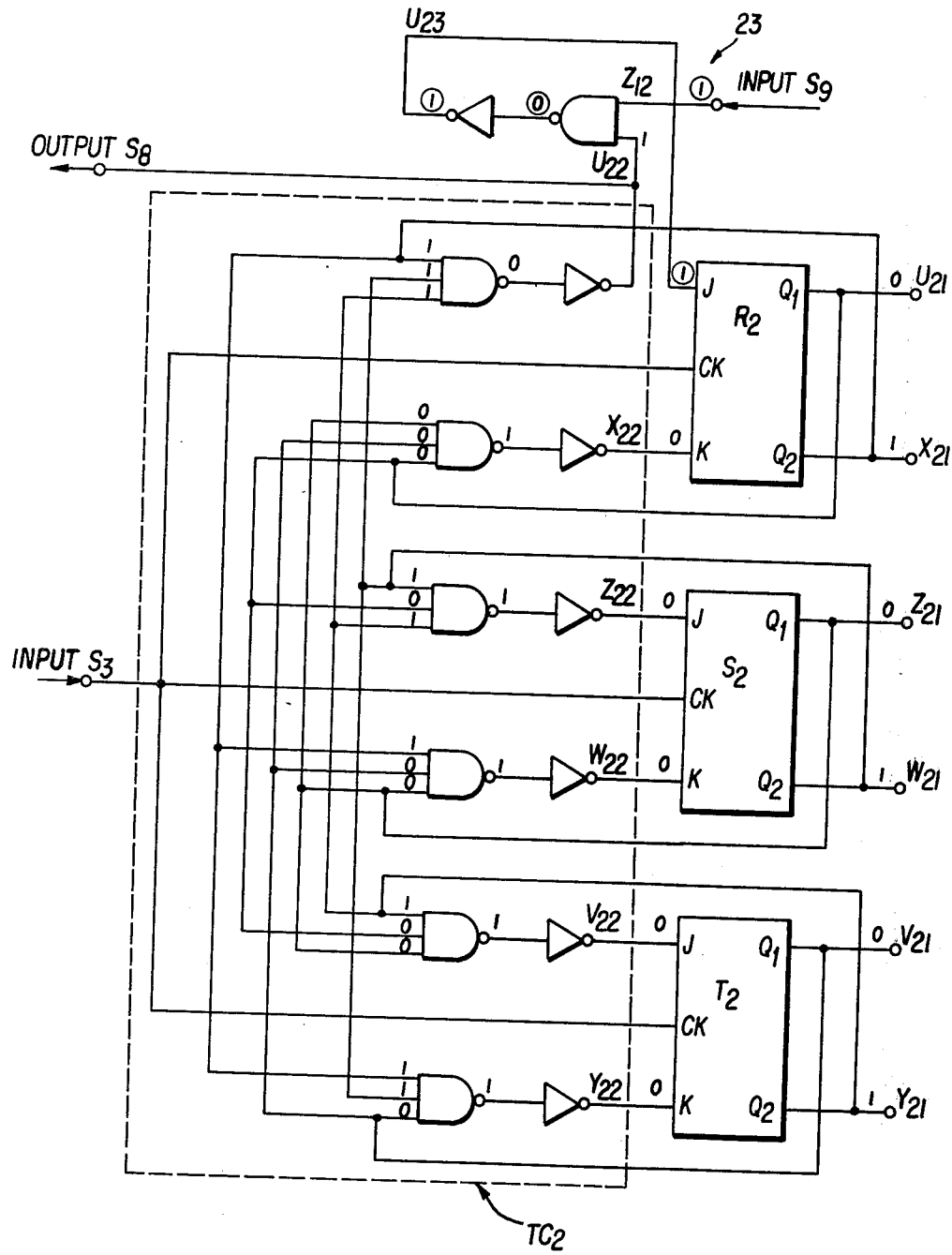
Figure 6G:
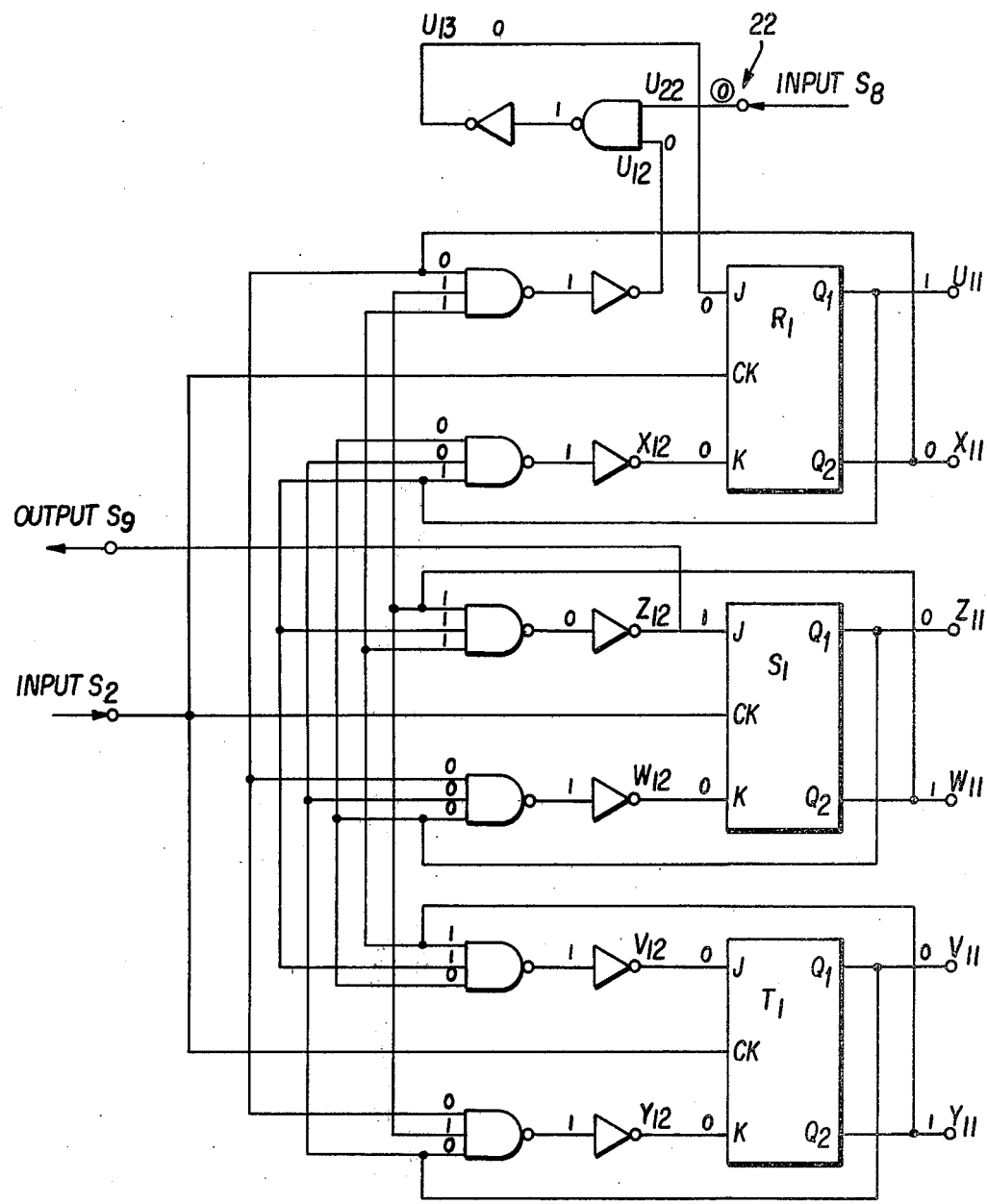
Figure 6H:
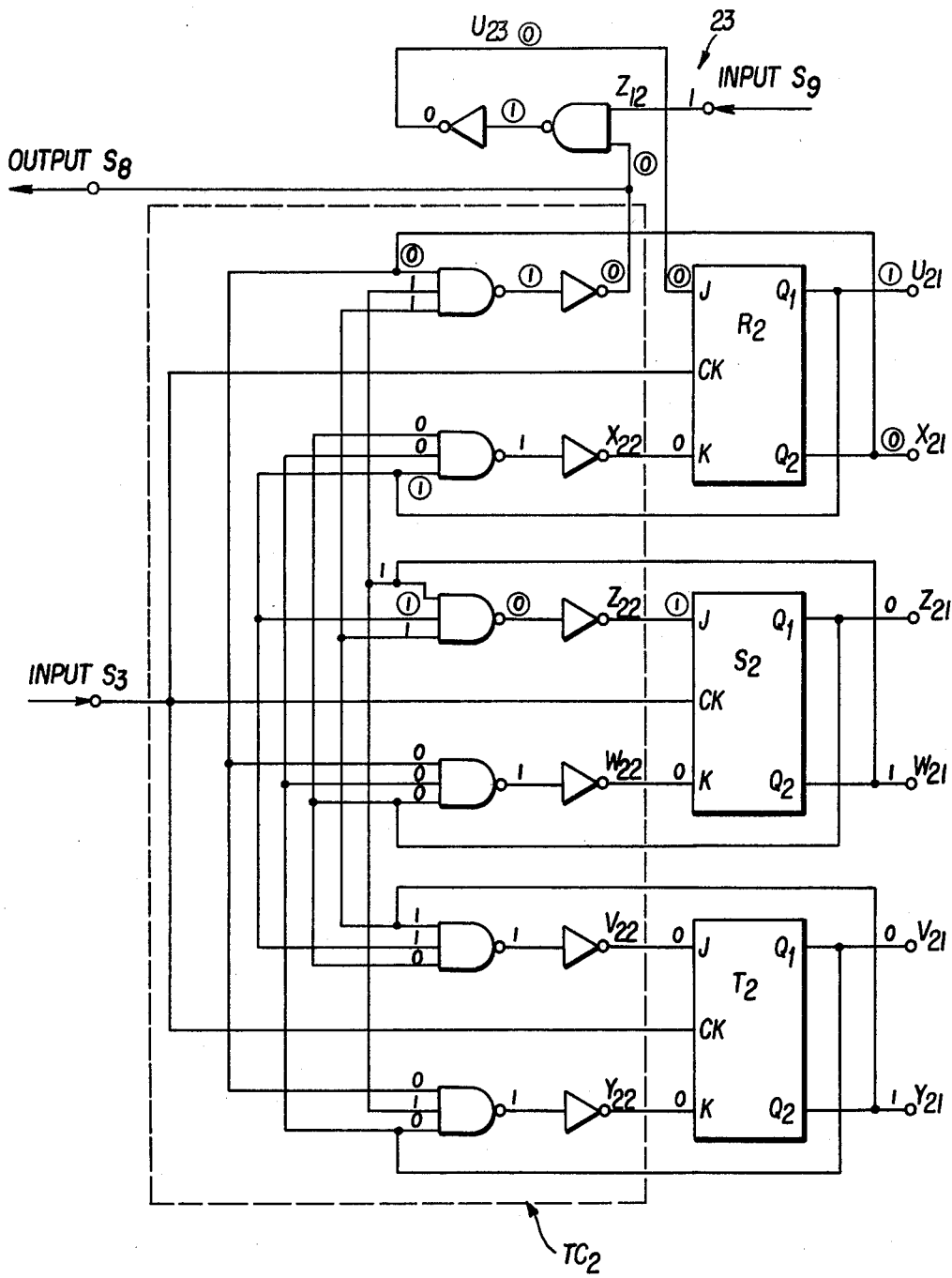

When the pulse $S_2$ is applied to the clock terminal CK of the ring counter circuit 22 at time $t_2$ shown in FIGS. 2A-1 and 2A-2, each state of each point of the ring counter circuits 22 and 23 are shown in FIGS. 6E and 6F. That is, as a result the output of the terminal $X_{11}$ changes to "0," and the outputs of the terminals $U_{11}$ and $U_{13}$ change to "0." Moreover, as a result the output of the terminal $U_{11}$ changes to "1" and the outputs of the terminals $Z_{12}$ and $U_{23}$ change to "1." When the pulse $S_3$ is applied to the ring couter circuit 23 at time $t_3$ shown in FIGS. 2A-1 and 2A-2, each state of the ring counter circuits 22 and 23 are shown in FIGS. 6G and 6H, respectively.

Figures 1, 2B:
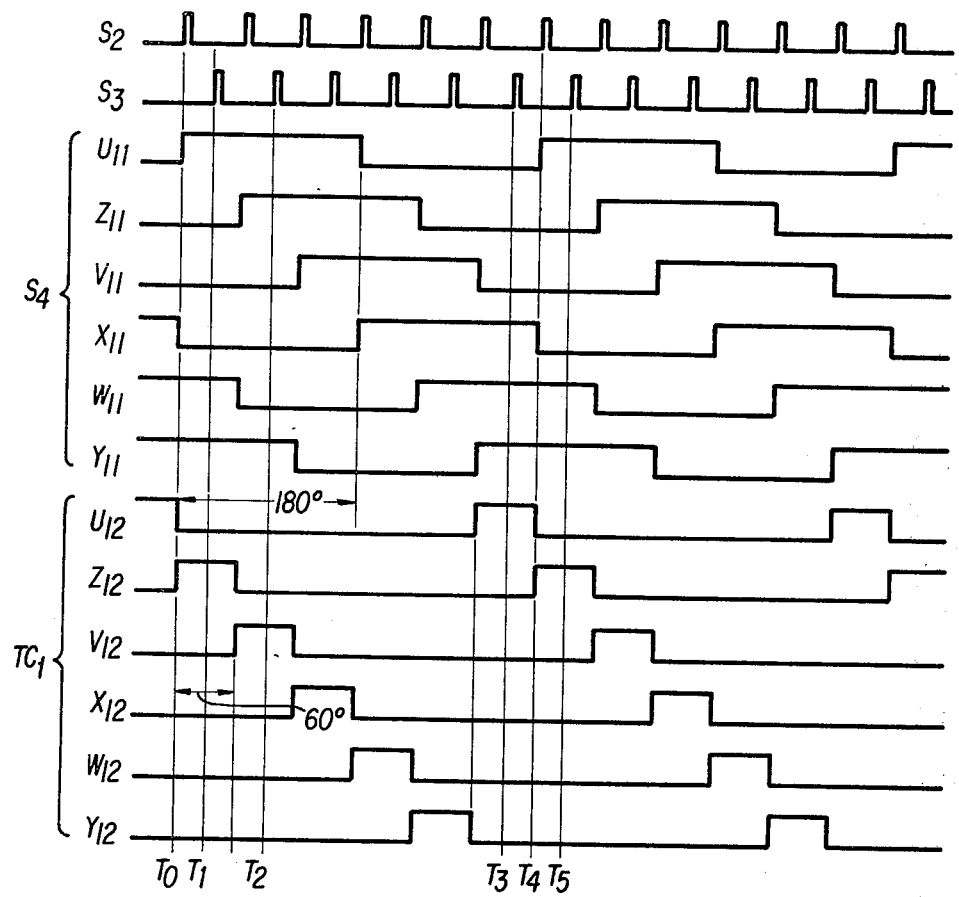
Figures 2, 2B:
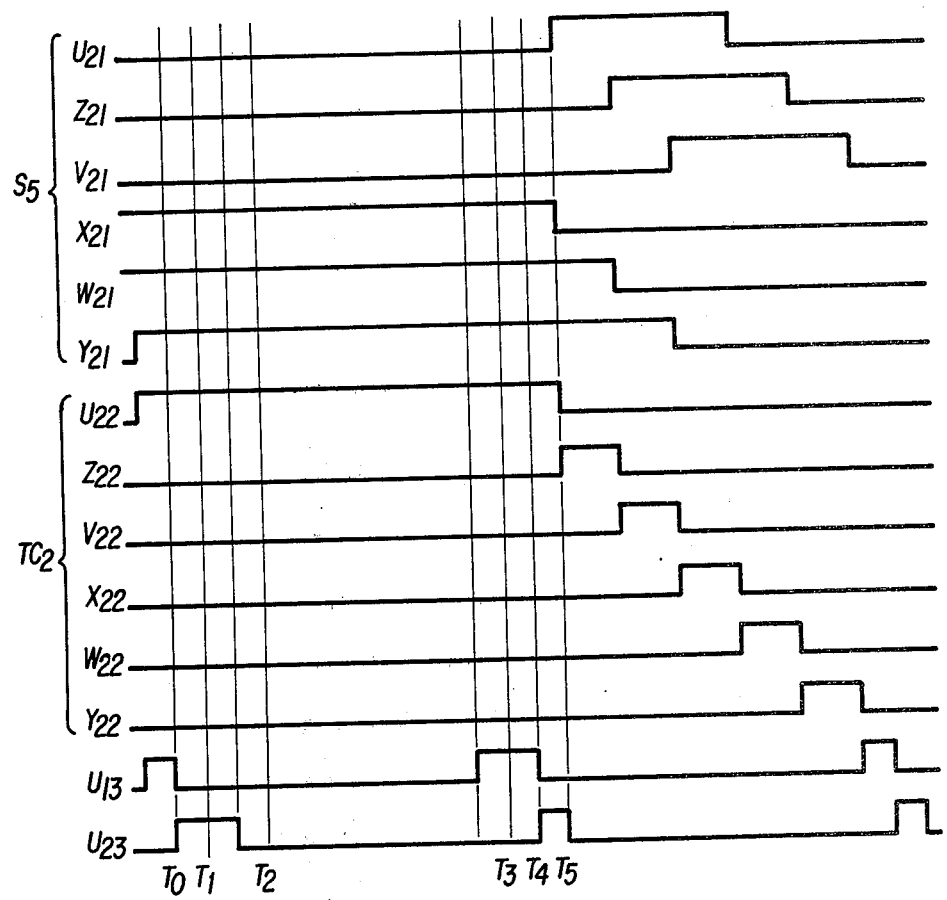

The abnormal operation of the ring counter circuits 22 and 23 will now be explained with reference to FIGS. 2B-1 and 2B-2. It is assumed that both of the ring counters 22 and 23 are operated until time $t_0$ as shown in FIGS. 2B-1 and 2B-2, and that at time $t_1$ the pulse $S_3$, which is marked by oblique lines, does not appear. Thus the output of the terminal $U_{21}$ does not change to "1." At time $t_2$, even though the pulse $S_3$ is applied to the ring counter circuit 23, the J - K flip-flop $R_2$ does not change because the output of the terminal $U_{23}$ is "0." Moreover, the J - K flip-flops $S_2$ and $T_2$ of the ring counter circuit 23 do not change because each of the outputs of the terminals $Z_{22}$, $W_{22}$, $V_{22}$ and $Y_{22}$ are "0". Accordingly, until time $t_3$ even though the pulse $S_3$ is applied to the ring counter circuit 23, the J - K flip-flops $R_2$, $S_2$ and $T_2$ do not change and thus remain in the state they were in before time $t_0$. At time $t_4$ the output of the terminal $Z_{12}$ changes to "1" and the output of the terminal $U_{23}$ changes to "1." As a result the J - K flip-flop $R_2$ of the ring counter circuit 23 changes state at time $t_5$. At time $t_5$, when the pulse $S_3$ is applied to the ring counter circuit 23, the outputs of the terminals $U_{21}$, $X_{21}$ and $U_{23}$ are "1," "0" and "0," respectively. After that, each time the pulse $S_3$ is applied, the ring counters 22 and 23 operate normally. Thus, even though one ring counter circuit 22 or 23 malfunctions at time $t_1$, after time $t_5$ it is possible for the malfunctioning circuit to return to the normal state. The period between time $t_1$ and $t_5$ is 360°.

As discussed above, when a noise pulse is applied to one ring counter circuit 22 or 23, the ring counter generates a miscount. After a predetermined time period, which is a maximum of one period of the inverter output frequency, the interlock signal $S_8$ or $S_9$ will appear from the normally functioning ring counter circuit. The output signals $U_{11}$ through $Y_{11}$ or $U_{21}$ through $Y_{21}$ of the malfunctioning ring counter circuit will remain unchanged after the occurrence of the disturbance until the interlock signal appears. The disturbed ring counter circuit will then resume normal operation. It should be understood that when noise is applied to the controlling device, the output waveform of the inverters will be disturbed for a maximum of one period of the inverter output frequency. After that one period the output waveform of the inverter will recover because the ring counter circuits 22 and 23 are maintained in a predetermined phase relationship by the function of the interlock signals $S_8$ and $S_9$ between the ring counter circuits. Moreover, since the transient current of such an abnormal period is restricted and smoothed by the DC reactors 12 and 13, the AC electric motor is not affected by the noise pulse. It is therefore possible to improve the noise resistance of the controlling device for an AC electric motor according to this invention compared with the prior art.

Figure 7:
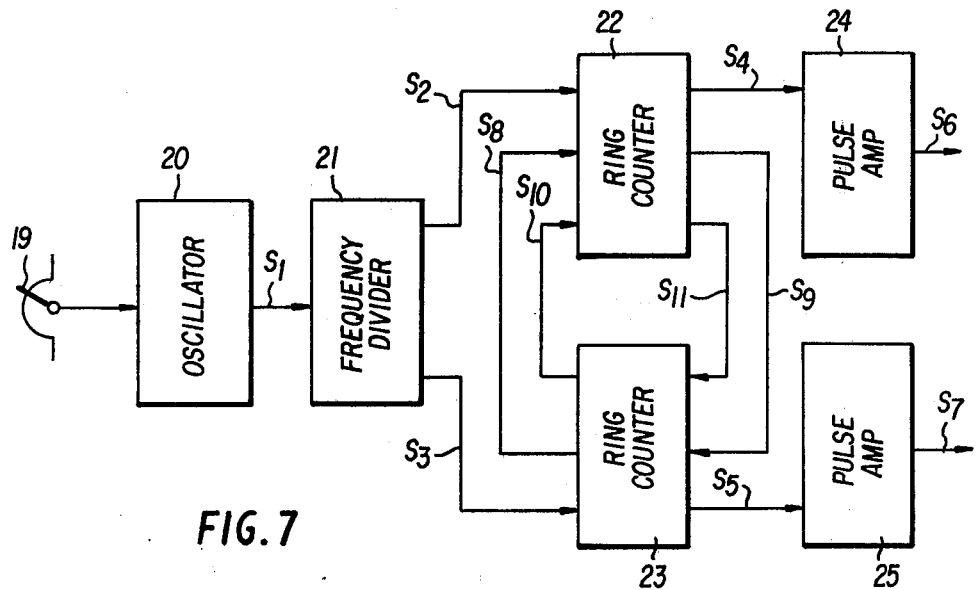
FIGS. 7 and 8 are modifications of the controlling device according to this invention.

In accordance with another preferred embodiment, FIG. 7 shows two additional interlock signals $S_{10}$ and $S_{11}$ being connected between the ring counter circuits 22 and 23. In FIG. 7 the interlock signals $S_8$ and $S_{10}$ from the ring counter circuit 23 are applied to the ring counter circuit 22. The period at which the terminals J and K of the J - K flip-flop $R_1$ of the ring counter 22 are, respectively, kept at the logic level "1," is restricted to thirty degrees during normal operation similar to the signal $U_{13}$ of FIGS. 2A-1 and 2A-2. Similarly, the period which the terminals J and K of the J - K flip-flop $R_2$ of the ring counter circuit 23 are respectively kept at the logic level "1" is restricted to thirty degrees. Thus, by being provided with four interlocking means as interlocking signals, $S_8$ through $S_{11}$, the period from the point of the application of noise to the point of the next normal state is improved to one-half period at a maximum. Accordingly, the embodiment shown in FIG. 7 is advantageous in that the disturbance to the electric motor is reduced compared with that of the embodiment shown in FIG. 1.

Figure 8:
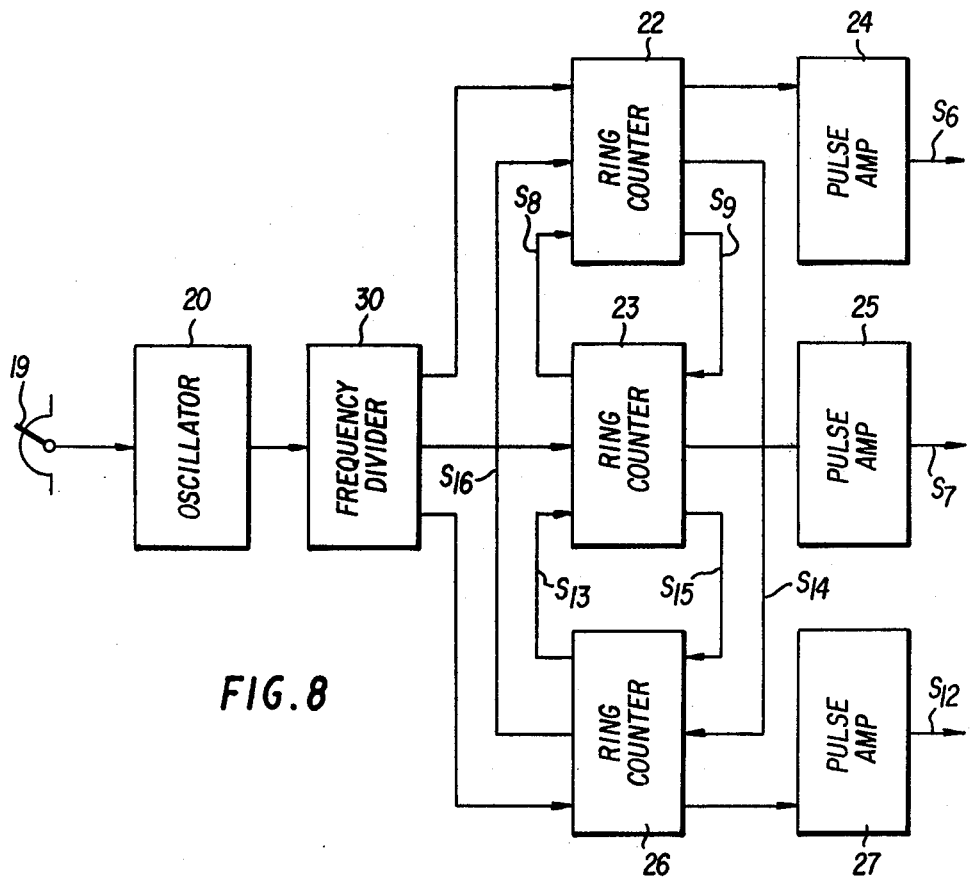

Referring now to FIG. 8, still another alternative and preferred embodiment is shown which includes a frequency divider 30 having three outputs, an additional ring counter circuit 26, and an additional pulse amplifying circuit 27 for driving a current control type of the inverter (not shown). The oscillating pulse signal of the oscillator 20, which generates a pulse signal having a frequency eighteen times that of the inverter output frequency is distributed to three ring counter circuits 22, 23 and 26 and is outputed as gate signals $S_6$, $S_7$ and $S_{12}$ for driving the inverter through the pulse amplifying circuits 24, 25 and 27. In this case, the gate signal $S_7$ lags the gate signal $S_6$ by a phase of twenty degrees and the gate signal $S_{12}$ lags the gae signal $S_7$ by a phase of twenty degrees. At this time, since the interlock signals $S_8$, $S_9$, $S_{13}$, $S_{14}$, $S_{15}$ and $S_{16}$, as shown in FIG. 8, are applied to each of the ring counter circuits 22, 23 and 26, it is possible to obtain signals corresponding to the signals $U_{13}$ and $U_{23}$ shown in FIGS. 2A-1 and 2A-2 which have pulse widths of twenty degrees. When noise is applied to the controlling device, the output waveform of the inverter is disturbed only for one period of the inverter output frequency at a maximum. The main circuit which is employed in FIG. 8 is provided with corresponding DC reactors, a current control type of the inverter, and a transformer (not shown).

Although the present invention has been explained by way of example using a ring counter circuit, conventional circuits such as SCR ring counters could be used. It should now be apparent that in the present invention it is possible to employ a ring counter of twelve bits or N bits. Moreover, the number of the interlock signals is not limited.

It should now be apparent from the above discussion that in accordance with the teachings of the present invention, since the interlock signals are interconnected between a plurality of ring counters in the driving means, and the interlock signals appear at least once during each period of each ring counter, if noise is applied to the driving means, the output waveform of the inverter is transiently disturbed. However, after a maximum of one period of the inverter output frequency, the output waveform will return to normal. Accordingly, even though the noise is applied, after a certain short time period, the load operation can be continued normally.

Obviously, many modifications and variations of the present invention are possible in light of the teachings of the present invention. It is therefore to be understood that within the scope of the appended claims, the invention may be practiced otherwise than as specifically described herein.

What is claimed as new and desired to be secured by Letters Patent of the United States is:

1. A device for controlling a plurality of power converters which are connected in parallel with each other and which convert direct current power into alternating power, said device comprising:
  reference circuit means for producing a reference signal having a frequency proportional to the frequency of the output of said controlling device;
  a plurality of converter driving means coupled to each of said parallel power converters for driving said converters in response to said reference signal, one of said converter driving means being provided for each of said parallel converters; and interlock means coupled to each of said plurality of converter driving means for supplying interlock signals to each of said plurality of converter driving means and for maintaining each of said power converters in an exact phase relationship to each other.

2. A device for controlling a plurality of power converters as recited in claim 1, wherein:
each of said plurality of converter driving means includes a ring counter circuit, each ring counter producing a plurality of output signals, the number of said output signals being equal to the number of controllable semiconductor switching elements contained in the power converter driven by said driving means.

3. A device for controlling a plurality of power converters as recited in claim 2, wherein said ring counter circuit comprises:
a plurality of J - K type flip-flop circuits coupled to operate as a ring counter.

4. A device for controlling a plurality of power converters as recited in claim 2, wherein each of said plurality of converter driving means includes:
detector means for determining a predetermined period from the output of said ring counter circuit included in said converter driving means; and
adder means for combining the output of said detector means with the interlock signals from said interlock means.

5. A device for controlling a plurality of power converters as recited in claim 4 wherein:
each of said detector means and each of said adder means are comprised of logic circuits.

6. A device for controlling a plurality of power converters which are connected in parallel with each other and which convert direct current power into alternating power, said device comprising:
reference circuit means for producing a reference signal having a frequency proportional to the frequency of the output of said controlling device;
frequency divider means for dividing the frequency of said reference signal by the number of said plurality of power converters connected in parallel;
a plurality of converter driving means coupled to each of said parallel power converters for driving said converters in response to the output of said frequency divider means, one of said converter driving means being provided for each of said parallel power converters; and
interlock means coupled to each of said plurality of converter driving means for supplying interlock signals to each of said plurality of converter driving means, and for maintaining each of said power converters in an exact phase relationship to each other.

7. A device for controlling a plurality of power converters as recited in claim 6, wherein said reference circuit means comprises:
control means for selecting the frequency of said reference signal; and
oscillator means for generating said reference signal in response to the output of said control means.

8. A device for controlling a plurality of power converters which are connected in parallel with each other, which converts direct current power into alternating current power, and which supply said alternating current power to a load, said device comprising:
reference circuit means for producing a reference signal having a frequency proportional to the frequency of the output of said controlling device;
frequency divider means for dividing the frequency of said reference signal by the number of said plurality of power converters connected in parallel;
a plurality of converter driving means coupled to each of said parallel power converters for driving said converters in response to the output of said frequency divider means, one of said converter driving means being provided for each of said parallel power converters;
interlock means coupled to each of said plurality of converter driving means for supplying interlock signals to each of said plurality of converter driving means, and for maintaining each of said power converters in an exact phase relationship to each other; and
a plurality of phase shifting transformers coupled to the output of each of said power converters for shifting the phase of the output of said converters such that the alternating current power supplied to said load by each of said power converters is in phase.

* * * * *

UNITED STATES PATENT AND TRADEMARK OFFICE
CERTIFICATE OF CORRECTION

PATENT NO. : 4,268,900
DATED : May 19, 1981
INVENTOR(S) : AKIO HIRATA

It is certified that error appears in the above-identified patent and that said Letters Patent are hereby corrected as shown below:

Please insert the Assingee Information to read as follows:

[73]--Assignee:

Tokyo Shibaura Denki Kabushiki Kaisha

Kawasaki-shi, JAPAN

Signed and Sealed this

Twenty-second Day of September 1981

[SEAL]

Attest:

Attesting Officer

GERALD J. MOSSINGHOFF

Commissioner of Patents and Trademarks